Figure 9:
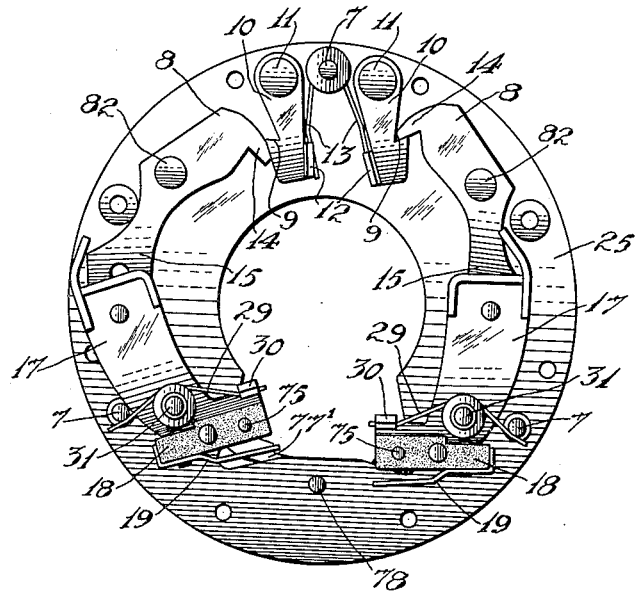

Aug. 6, 1940.  C. F. BIERBACH  2,210,057
DIRECTION INDICATING DEVICE FOR MOTOR VEHICLES
Filed May 9, 1939  3 Sheets-Sheet 1
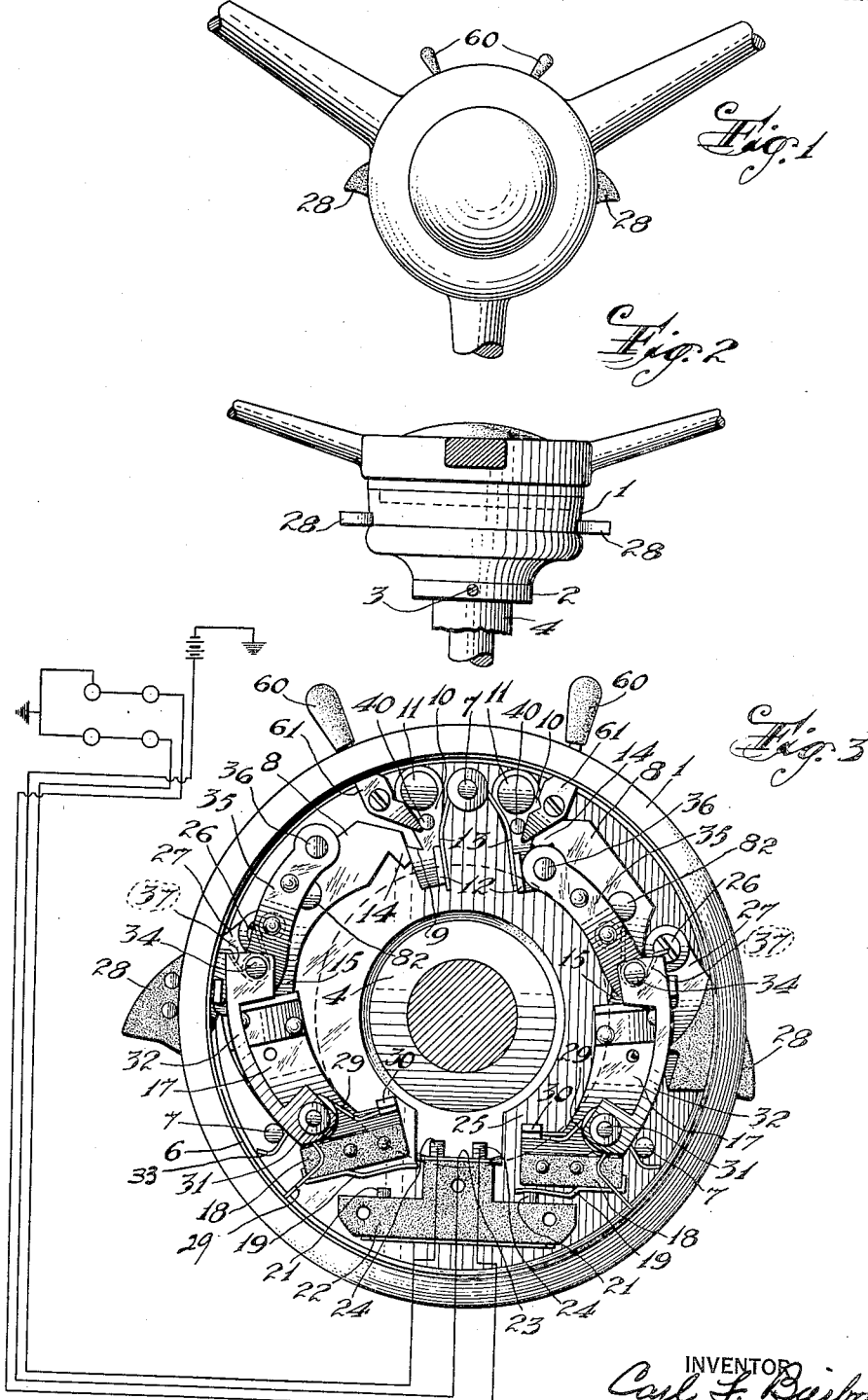
INVENTOR
Carl F. Bierbach,
BY Frank C. Fischer
ATTORNEY

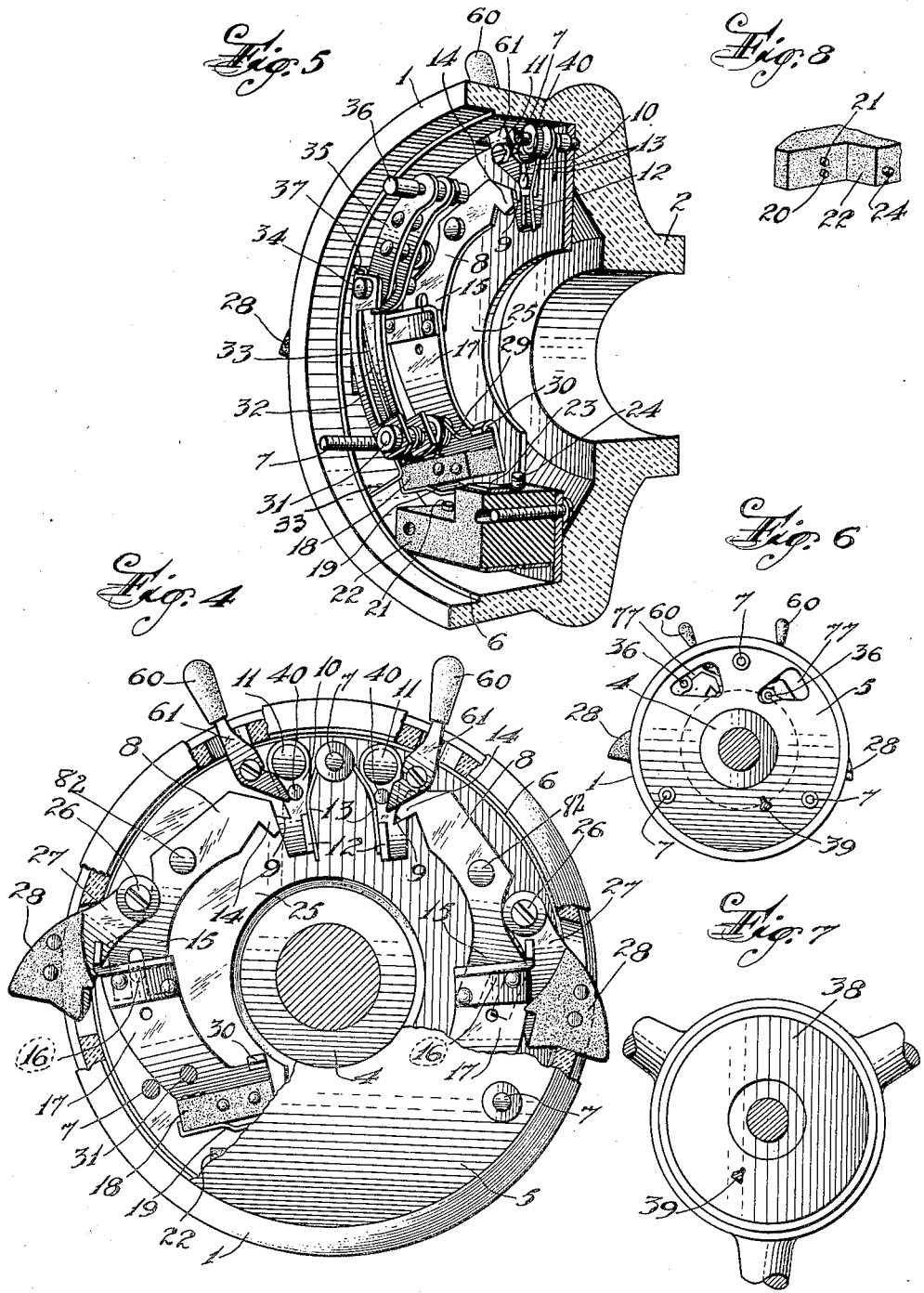

Aug. 6, 1940.                C. F. BIERBACH                2,210,057
             DIRECTION INDICATING DEVICE FOR MOTOR VEHICLES
                       Filed May 9, 1939        3 Sheets-Sheet 3

INVENTOR
Carl F. Bierbach
BY Frank C. Fischer
ATTORNEY

Patented Aug. 6, 1940 2,210,057

UNITED STATES PATENT OFFICE 2,210,057

DIRECTION INDICATING DEVICE FOR MOTOR VEHICLES

Carl F. Bierbach, Newark, N. J., assignor to A. D. S. Corp., Newark, N. J., a corporation of New Jersey Application May 9, 1939, Serial No. 272,576

7 Claims. (Cl. 200—59)

This invention relates to signalling devices for motor vehicles and more particularly to improvements for indicating the direction in which the motor vehicle is to be turned.

With closed automobiles and large trucks, it is often difficult and inconvenient for the driver to indicate to drivers of following and approaching vehicles, the direction in which the vehicle is to be turned. This is especially true in the winter time when it is necessary to keep the windows closed. Also, trucks are now built of such a size that it is impractical for the driver to extend his hand beyond the side walls of the truck to indicate a turn.

It is, therefore, an object of this invention to provide a device positioned on the steering post adjacent the steering wheel within easy reach of the hands of the driver of the motor vehicle, for indicating the direction in which the vehicle is to be turned. The device is preferably mounted on the steering post beneath the steering wheel, and provided with finger pieces which can be readily and conveniently manipulated by the fingers of the driver without necessitating the removal of the hand from the steering wheel.

A further object is the provision of a direction indicating device for motor vehicles, which device is simple in structure and positive in operation, and will not readily get out of order no matter how frequently it may be used.

A further object is the provision in a direction indicating device for motor vehicles, of means for automatically returning the parts of the device to a neutral position after the motor vehicle has made the desired turn indicated by the device, and again straightened out.

A further object of the invention is the provision of an indicating device for motor vehicles, having means which enable the continuance of the signal as long as the vehicle is being turned in the same direction; and means to automatically return the parts to a neutral position and discontinue the signal after the preceding vehicle has been passed.

A further object is the provision of an indicating device which can be readily and conveniently installed on any type of motor vehicle without material alteration.

Figure 10:
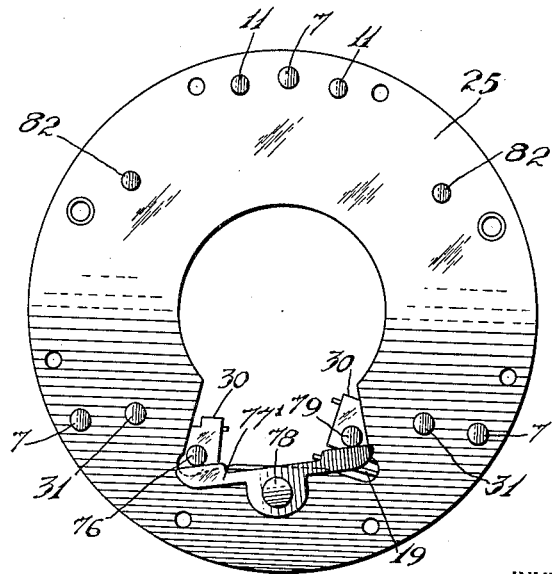

These and other advantageous objects, which will later appear, are accomplished by the simple and practical construction and arrangement of parts hereinafter described and exhibited in the accompanying drawings, forming part hereof, and in which:

Fig. 1 is a plan view of a portion of a steering wheel associated with a device embodying the invention, Fig. 2 is an elevational view of the device shown in Fig. 1, Fig. 3 is a plan view of the control device with the cover removed, Fig. 4 is a plan view of the control device with the steering wheel removed and part of the cover broken away, Fig. 5 is a perspective view, partly in section, of one side of the device, Fig. 6 is a plan view of the control device, Fig. 7 is a bottom view of a steering wheel used in connection with the device, and Fig. 8 is a perspective view showing a portion of an insulating block, carrying contact members, used in the device, Fig. 9 is a top view of a plate used in the device, and Fig. 10 is a bottom view of the plate shown in Fig. 9.

Referring to the drawings, the indicating device is shown to comprise a casing 1 having a collar portion 2, on the underside thereof, which is attached by means of set screws 3 to a steering post 4 of an automobile. The casing is provided with a cover plate 5 which rests upon shoulders 6 and has apertures which fit over pins 7, projecting upwardly from the bottom of the casing, said plate being provided with a slot 77.

Referring to Figs. 3, 4 and 5, pivotally mounted on a plate 25, in the casing, on each side thereof are levers 8 pivotally mounted at 82. The structure on each side of the casing being the same, only one side will be described.

The lever 8 has one end thereof adapted to engage a shoulder 9 of a lever 10, pivoted at 11 to the casing, the lever 10 having an upstanding boss 12 which engages a spring 13, the spring tending normally to force the lever 10 towards the end 14 of lever 8. The other end 15 of lever 8 is forked and embraces a pin 16 (see Fig. 4) on a lever 17, which is pivotally mounted in the casing. The opposite end of the lever 17 is provided with a block 18 of insulating material carrying thereon a metallic spring brush contact member 19 adapted to engage contacts 20 and 21 (see Fig. 8) supported by a block 22 of insulating material, the contact 20 being connected through the block 22 to a terminal 23 which is connected to the positive pole of the storage battery of an automobile, and the contact 21 is connected to a lead 24 which is connected to an indicating lamp, not shown, on the right side of the automobile.

Wires connected to terminals 23 and 24 pass beneath the plate 25 and out through the casing to the battery and to indicating lamps, the latter of course being grounded. Pivotally mounted on plate 25 at 26 is a plate 27 having a handle 28 projecting through an aperture in the side wall of the casing 1.

The plate 27 is adapted to bear against lever 8 so that when the handle 28 is moved into the casing the lever 8 will be moved so that the end portion 14 thereof will engage the shoulder 9 on lever 10 and hold the levers in a latched condition as shown in Fig. 3 with the metal brush 19 closing a circuit between the contacts 20 and 21. A spring 29 bears against the shoulder 30 on lever 17 (see Fig. 3) and tends to move lever 17 and lever 8 to an unlatched condition.

Projecting upwardly from plate 25 is a pin 31 upon which lever 17 is pivoted. Separated from lever 17 by suitable spacers is an upper lever 32. The lever 32 is arcuate and channelled shaped and a spring 33 is wound about the pin 31, the spring 33 engaging the lever 32 in the channel thereof and having another end engaging the inner wall of the casing 1. Pivotally connected to lever 32 at 34 is a lever 35 having at the free end thereof pin 36 which projects upwardly through the slot 77 in plate 5. The lever 35 is normally urged away from the wall of the casing 1 by a spring 37 which is wound about a pin 34, one end of the spring 37 engaging the inner wall of the casing 1 and the other end engaging the lever 35. Attached to the underside of the steering wheel of the automobile is a plate 38 having projecting therefrom a projection 39 (see Fig. 7).

In operation, when the handle 28 is moved inwardly for the purpose of indicating a turn in a certain direction, it moves lever 8 to cause it to be latched by lever 10 and also lever 17 is moved to close an electrical circuit between the contacts 20 and 21. If a right turn is being made, the levers will be substantially as shown in Fig. 4 and as long as the steering wheel is turned to the right the signal will be maintained, as right turning of the wheel will cause projection 39 to move pin 36 in slot 77. The pin 36 is moved just enough to allow projection 39 to pass thereover and not interfere with the turning of the wheel.

After the turn has been completed, and it is desired to drive in a straight line or turn in an opposite direction, the steering wheel is then turned to the left which causes pin 36 to engage pin 40 projecting upwardly from lever 10 which will move the lever 10 to cause disengagement of the shoulder 9 with the end 14 of lever 8, and allowing levers 8 and 14 to be returned to their normal unlatched condition by the springs associated therewith.

Should the device be set as shown in Fig. 4 to make a right turn and the operator should desire not to make this turn, the parts can be returned to their original position by bearing upon a handle 60 of the lever 61 to move latch lever 10 against the action of spring 13 to disengage shoulder 9 and the end 14 and allow the parts to be automatically returned to their normal positions by the springs associated therewith.

The various parts are mounted upon the plate 25 which can be readily removed from the casing when desired. Also, it should be noted that the levers are arcuate in shape and arranged around the central aperture in plate 25 which enables the device to be applied to various sizes of steering posts without alterations.

In Fig. 9 there is shown a top view of the plate 25 in which the block of insulating material 19 is riveted to lever 17 by rivet 75.

The rivet 75 passes beneath the plate and has an enlarged portion 76 which is adapted to bear against one end 77' of a lever pivoted at 78 on the bottom of plate 25. When the handle 28 is pushed inwardly, for example, to indicate a right turn, the parts will be latched as shown in Fig. 9 and in Fig. 4, and pin 76 will extend below plate 25 and engage the end 77' of the lever pivoted at 78, which will move the lever into a position to engage the pin 79 on the left hand block of insulating material, which prevents movement of the handle on the left hand side of the device to indicate a left hand turn. In other words, when the device has been set to indicate a right turn, the structure above described prevents movement of the device to indicate a left turn until the right turn has been made.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. In a direction indicating device for motor vehicles, a casing adapted to be mounted upon a steering post, a first lever pivotally mounted in the casing, contact means on said lever for closing an electrical circuit when one end of said lever is moved inwardly in the casing, a pin projecting from said lever, a second lever having a forked end engaging said pin, a third lever pivotally mounted in the casing and having a shoulder adapted to engage one end of the second lever, spring means normally urging the third lever into engagement with the second lever, a plate pivotally mounted in the casing and having a handle extending outside of the casing to move the first lever inwardly, a fourth lever pivotally mounted in the casing and positioned above the first lever, a fifth lever pivotally connected to the fourth lever and having a pin at the free end thereof, a cover plate having a slot therein, said pin being movable in said slot, spring means tending to maintain the fifth lever in a predetermined position, a steering wheel having a projection on the underside thereof adapted to engage the pin to move the latter freely in the slot when the vehicle is being turned, said projection on the steering wheel engaging the pin on the fifth lever to move the pin into engagement with the third lever to disengage the third lever from the second lever when the wheel is turned in a direction to straighten the guide wheels of the vehicle, and spring means to return all of said levers to their normal positions after the guide wheels have been straightened out.

2. In a direction indicating device for motor vehicles, a casing adapted to be mounted upon a steering post, a first pair of levers pivotally mounted in the casing and pivotally connected to each other, one of said levers having contact means for closing an electrical circuit, spring controlled means for holding the other lever in a predetermined latched condition, a handle projecting out of the casing and arranged to move said levers to a position to be latched, a second pair of levers positioned above the first pair of levers and pivotally connected to each other, a pin at the extremity of one of said second pair of levers, a steering wheel having a projection on the underside thereof adapted to engage said pin, said projection on the steering wheel passing freely over said pin during the turning of the wheel in one direction and engaging said pin to move the latter into a position to release the latching means when the wheel is turned in an opposite direction, and spring means to return said levers to a definite position when the wheel has been turned to straighten out the guide wheels of the vehicle.

3. In a direction indicating device for motor vehicles, a casing adapted to be mounted on a steering post, a first pair of levers pivotally mounted in the casing, one of said levers having contact means for closing an electrical circuit, a handle projecting from the casing to move said levers to make contact, means to latch said levers to maintain said contact during the turning of the vehicle, a third lever having a pin at one end thereof, a steering wheel having a projection on the underside thereof adapted to engage said pin, said projection passing freely over the pin during the turning of the guide wheels of the vehicle from a straight line, said projection engaging said pin to move said pin to release the latching means during the turning of the steering wheel to straighten out the guide wheels of the vehicle, and spring means to normally hold said levers in a predetermined position.

4. In a direction indicating device for motor vehicles, a casing adapted to be mounted upon a steering post, a first lever having means thereon for closing an electrical circuit, a second lever pivotally connected to the first lever, spring controlled latching means for holding said second lever when the latter is moved to a predetermined position, a third lever pivotally mounted in the casing above the first lever, a fourth lever pivotally connected to the third lever and positioned above said second lever, a pin at the extremity of the fourth lever, a steering wheel having a projection on the underside thereof adapted to engage said pin, said projection passing freely over the pin during the turning of the vehicle and engaging said pin to cause said pin to release the latching means when the steering wheel is turned to straighten out the guide wheels of the vehicle, and spring means to return said levers to their normal positions when the guide wheels have been straightened out.

5. In a direction indicating device for motor vehicles, a casing adapted to be mounted on a steering post, contact means in the casing to close an electrical circuit, latching means for holding said contact means in a circuit closing position, a lever pivotally mounted in the casing and having a pin at one end thereof positioned adjacent said latching means, a steering wheel having a projection extending downwardly from the underside thereof, adapted to engage said pin, said projection passing freely over the pin during the turning of the steering wheel to turn the guide wheels of the vehicle from a straight line, said projection engaging said pin to move the pin to release said latching means when the steering wheel is turned in a direction to turn the guide wheels of the vehicle to a straight line.

6. In a direction indicating device for motor vehicles, a casing adapted to be mounted on a steering post, a plate in said casing, a pair of levers mounted on said plate, each of said levers having a rivet passing therethrough and extending beneath said plate, a two-armed lever pivotally mounted on the underside of said plate and adapted to engage said rivets, said lever being arranged so that when one of said first mentioned levers has been moved to indicate a turn the other lever will be prevented from being moved to a position to indicate a turn.

7. In a direction indicating device for motor vehicles, a casing adapted to be mounted on a steering post, a plate in said casing, a pair of levers mounted on said plate, each of said levers having means thereon to close an electrical circuit, each of said levers having a projection thereon, a two-armed lever pivotally mounted on said plate and adapted to engage said projections, said two-armed lever being independent of said electrical circuit and arranged so that when one of said first mentioned levers has been moved to indicate a turn the other lever will be prevented from being moved to a position to indicate a turn.

CARL F. BIERBACH.